United States Patent
Knoth et al.

(10) Patent No.: US 8,783,135 B2
(45) Date of Patent: Jul. 22, 2014

(54) ELECTRO-MECHANICAL DRIVE-UNIT

(75) Inventors: Matthew R. Knoth, Indianapolis, IN (US); William S. Reed, Greenfield, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 168 days.

(21) Appl. No.: 13/570,669

(22) Filed: Aug. 9, 2012

(65) Prior Publication Data

US 2014/0041482 A1    Feb. 13, 2014

(51) Int. Cl.
*F16H 57/02*    (2012.01)
*F16H 57/04*    (2010.01)

(52) U.S. Cl.
USPC .......................................... 74/661; 74/606 A

(58) Field of Classification Search
USPC .......................... 74/661, 665 A, 606 R, 606 A
See application file for complete search history.

(56) References Cited

U.S. PATENT DOCUMENTS

| | | | | |
|---|---|---|---|---|
| 4,220,197 A | * | 9/1980 | Schaefer et al. | 165/263 |
| 6,822,353 B2 | * | 11/2004 | Koga et al. | 310/64 |
| 6,997,838 B2 | * | 2/2006 | Folsom et al. | 475/72 |
| 7,239,055 B2 | * | 7/2007 | Burgman et al. | 310/52 |
| 7,339,300 B2 | * | 3/2008 | Burgman et al. | 310/112 |
| 8,393,236 B1 | * | 3/2013 | Hauser et al. | 74/15.4 |

* cited by examiner

*Primary Examiner* — Ha D Do
(74) *Attorney, Agent, or Firm* — Quinn Law Group, PLLC

(57) ABSTRACT

An electro-mechanical drive-unit includes an input member, an output member, a drive-unit housing, and a gearing arrangement operatively connected to each of the output and input members. The drive-unit also includes a pump for circulating pressurized fluid and an electric motor. The electric motor includes a rotor connected to the gearing arrangement, a stator fixed relative to the drive-unit housing and having wire windings, and a motor housing configured to retain the rotor and the stator. The drive-unit also includes a fluid cavity between the drive-unit housing and the motor housing configured to receive the pressurized fluid. The drive-unit housing defines a passage in fluid communication with the fluid cavity. The drive-unit also includes a fastener having a head and a shank. The fastener is secured within the passage to facilitate discharging the fluid from under the fastener head onto the wire windings for cooling and/or lubrication thereof.

20 Claims, 4 Drawing Sheets

ELECTRO-MECHANICAL DRIVE-UNIT

TECHNICAL FIELD

The disclosure relates to an electro-mechanical drive-unit for a motor vehicle.

BACKGROUND

To produce a more efficient vehicle, hybrid vehicle powertrains combine an electric motor(s) and a conventional internal combustion engine. Torque from the engine and the electric motor(s) is typically channeled to the vehicle's driven wheels via a transmission. Efficiency of a hybrid vehicle powertrain is typically related to the driving conditions and percentage of time that the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor-generators and no internal combustion engine.

In either a hybrid or purely electric powertrain the electric motor(s) are operatively connected to a transmission having planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and in the case of the hybrid powertrain may similarly provide a selectable torque contribution from the engine to drive the subject vehicle.

SUMMARY

An electro-mechanical drive-unit connectable with at least one power source for launching and propelling a vehicle includes an input member, an output member, a drive-unit housing, and a gearing arrangement operatively connected to each of the output and input members. The drive-unit also includes a pump and an electric motor. The pump is configured to circulate pressurized fluid. The electric motor includes a rotor operatively connected to the gearing arrangement, a stator fixed with respect to the drive-unit housing and having wire windings, and a motor housing configured to retain the rotor and the stator. The drive-unit also includes a fluid cavity generated between the drive-unit housing and the motor housing. The cavity receives the pressurized fluid. The drive-unit housing defines a passage that places the housing in fluid communication with the fluid cavity. The drive-unit also includes a fastener having a fastener head and a fastener shank. The fastener is secured within the passage such that the passage discharges the pressurized fluid from under the fastener head onto the wire windings for cooling of the windings and lubrication of other components.

The electro-mechanical drive-unit may also include a feature disposed between the fastener head and the drive-unit housing. The feature defines an aperture configured to accept the fastener shank en route to the passage. The feature may define a slot originating at the aperture and extending beyond a perimeter of the fastener head. The slot may be in fluid communication with the passage and positioned to direct the pressurized fluid from under the fastener head onto the wire windings and/or other feature needing cooling and lubrication.

The feature may be a step configured as an integral part of the drive-unit housing. The step may include at least one of a counter-sink and a counter-bore located at the passage adjacent the fastener head and the slot may originate at the at least one of the counter-sink and the counter-bore.

The fastener may fix the motor housing to the drive-unit housing and define an effective size of the slot.

The feature may also be a plate that is a separate and distinct component from the drive-unit housing.

The plate may include a raised edge sandwiched between the fastener head and the drive-unit housing, and may also be configured to preload the fastener in the passage.

The fluid cavity may be sealed via a plurality of seals disposed between the drive-unit housing and the motor housing.

The motor housing may define apertures configured to discharge the pressurized fluid onto the wire windings for cooling thereof.

The electro-mechanical drive-unit may additionally include a pressure relief valve in fluid communication with the pump or a supply feed in fluid communication therewith. The pressure relief valve may be configured to control pressure of the fluid in the cavity.

The electro-mechanical drive-unit in conjunction with the power source, such as an internal combustion engine, may be part of a hybrid powertrain installed in and configured to launch and propel a vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
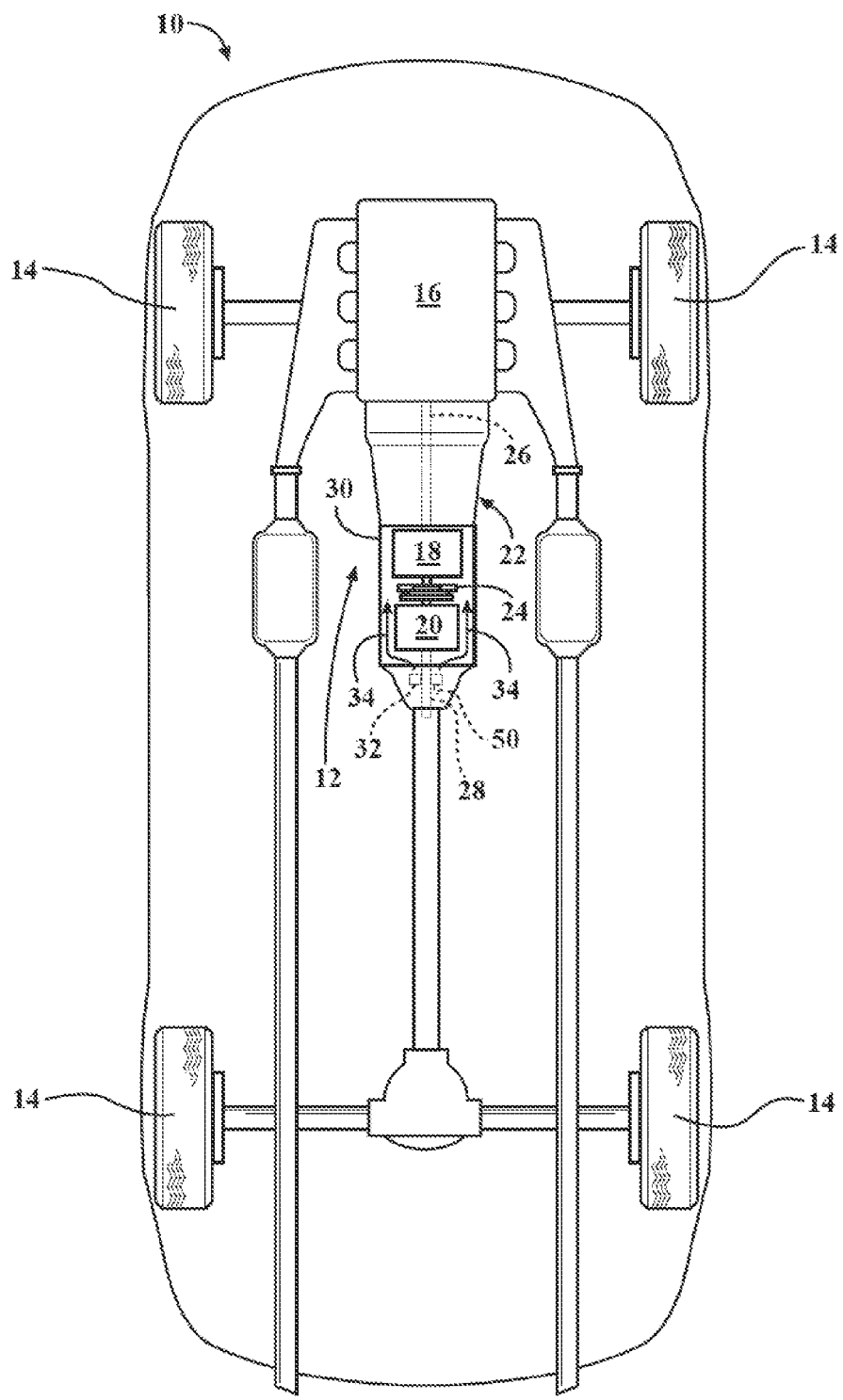
FIG. 1 is a schematic illustration of a hybrid electric vehicle employing an electrically variable transmission (EVT).

Referring to the drawings, wherein like reference numbers refer to like components, FIG. 1 illustrates a vehicle 10. The vehicle 10 includes a hybrid powertrain 12 configured to launch and propel the vehicle, i.e., to operate the vehicle in all speed ranges between low and high road speeds via drive wheels 14. As shown, the hybrid powertrain 12 includes multiple power sources, which may include an internal combustion engine 16, a first electric motor/generator 18, and a second electric motor/generator 20. The engine 16 is operatively connected to an electro-mechanical drive-unit that is depicted as an "electrically variable transmission" (EVT) 22. As additionally shown, first and second electric motor/generators 18, 20 are physically disposed inside the EVT 22.

As is known by those skilled in the art, an "electrically variable transmission" constitutes a gearing arrangement 24, which is typically configured as a transmission planetary gear train, operatively connected to each of the engine 16, the first motor/generator 18, and the second motor/generator 20. Channeling respective torques of the engine 16 and the two motor/generators 18 and 20 to different members of the planetary gear train permits one of the power sources to either assist or balance the operation of any of the other two. Thus, the combination of one engine 16 and two motor/generators 18 and 20 operatively connected to the EVT 22 allows speeds and torques of the engine and motor/generators to be controlled and selected independently in order to power the vehicle 10 more efficiently.

The vehicle 10 additionally includes an energy storage system having one or more batteries that are not specifically shown, but known by those skilled in the art. The energy storage system is operatively connected to the motor/generators 18 and 20 such that the motor/generators may transfer torque to or receive torque from the engine 16. Although not shown, the vehicle 10 also includes a controller or an electronic control unit (ECU). The controller is operatively connected to the power sources and to the energy storage system for controlling the distribution of torque from the power sources to the gearing arrangement 24.

Although the hybrid powertrain 12 as shown includes the engine 16, the EVT 22 may also be connectable solely to the first and second electric motor/generators 18, 20. In such a case, the powertrain 12 would no longer be a hybrid type, but would become purely electric, and the EVT 22 may then be broadly described as an electro-mechanical drive-unit. For simplicity and clarity, the remainder of the present description will refer to the electro-mechanical drive-unit as EVT 22 being connected to the engine 16, as well as to the motor/generators 18, 20. Additionally, the connections of the hybrid powertrain 12, to be described in greater detail below, may permit an overall decrease in torque requirement from the combination of the first and the second motor/generators 18 and 20 while affording acceptable vehicle performance, as compared with other systems.

As shown in FIG. 1, the EVT 22 includes an input member 26 which may be operatively connected to the engine 16 and an output member 28 which may be operatively connected to the drive wheels 14. The EVT 22 also includes a drive-unit housing 30 that functions as a stationary member to which certain torque transmitting devices (not shown) may be grounded on demand to affect shifts between distinct gear ratios. The gearing arrangement 24 operatively connected to each of the input and output members 26, 28. The EVT 22 also includes a pump 32, which may be electrically driven by the energy storage system noted above. The pump 32 is configured to circulate a pressurized fluid 34, such as specially formulated transmission oil, inside the EVT 22.

Figure 2:
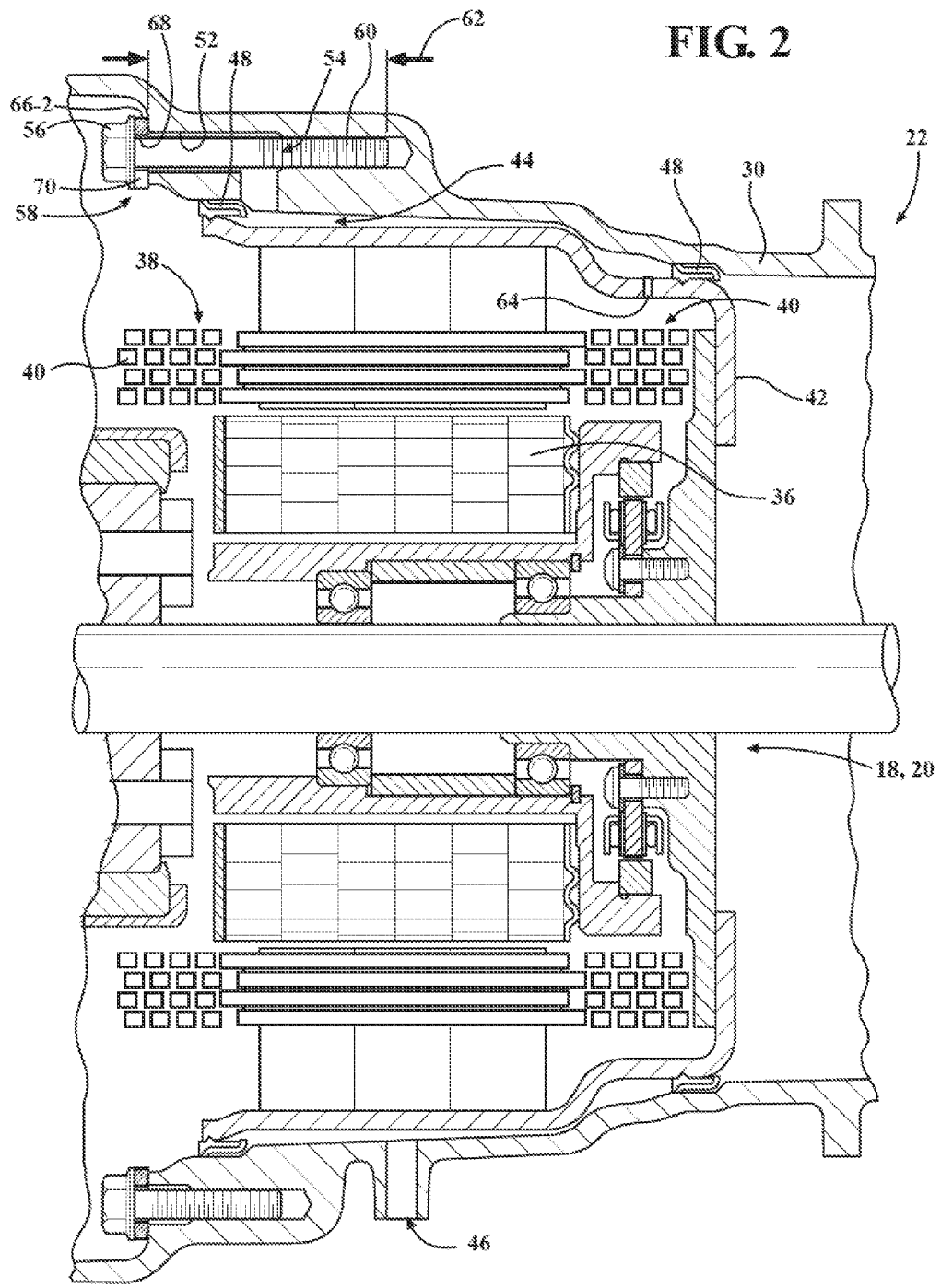
FIG. 2 is a partial close-up view of a cross-section of the EVT depicted in FIG. 1 having a fastener engaged in a passage and configured to discharge fluid onto an electric motor/generator.

As shown in FIG. 2, each of the first and second electric motor/generators 18, 20 includes a rotor 36 operatively connected to the gearing arrangement 24 and a stator 38 fixed with respect to the drive-unit housing 30. The stator 38 includes wire windings 40. Each of the first and second electric motor/generators 18, 20 also includes a motor housing 42 configured to retain the rotor 36 and the stator 38 inside the EVT 22. A fluid cavity 44 is generated or formed between the drive-unit housing 30 and the motor housing 42. During operation of the EVT 22, the fluid cavity 44 may receive the pressurized fluid 34 directly from the pump 32 or via a supply feed 46 disposed in the drive-unit housing 30 and in fluid communication with the pump. The fluid cavity 44 is sealed via a plurality of seals 48 disposed between the drive-unit housing 30 and the motor housing 42. The EVT 22 additionally includes a pressure relief valve 50 (shown in FIG. 1) in fluid communication with the pump 32 or the supply feed in fluid communication therewith. The pressure relief valve 50 is configured to control pressure of the fluid in the fluid cavity 44.

As shown in FIG. 2, the drive-unit housing 30 defines a passage 52 that is in fluid communication with the fluid cavity 44. A fastener 54 having a fastener head 56 defined by a perimeter 58 and a fastener shank 60 defined by a length 62 is secured within the passage 52. The fastener 54 may be employed to fix or attach the motor housing 42 to the drive-unit housing 30. In the case that the fastener 54 is configured as a bolt, the passage 52 is threaded to accept the subject bolt. Additionally, the passage 52 is configured to discharge the pressurized fluid 34 from under the fastener head 56 onto the wire windings 40 to affect cooling and lubrication thereof. Such cooling and lubrication are beneficial to the electric motor/generators 18, 20, because of an increase in thermal stress frequently seen by the wire windings 40 when electric current is repeatedly passed through the wire windings during operation of the EVT 22. Accordingly, continuous cooling via pressurized fluid 34 being discharged onto the wire windings 40 would serve to reduce temperature of the stator 38 and increase, operating window, longevity and reliability of the particular electric motor/generator 18 or 20. Furthermore, as shown in FIG. 2, the motor housing 42 may define apertures 64 configured to additionally discharge a portion of the pressurized fluid 34 from the fluid cavity 44 onto sections of the wire windings 40 for cooling thereof.

Figure 3:
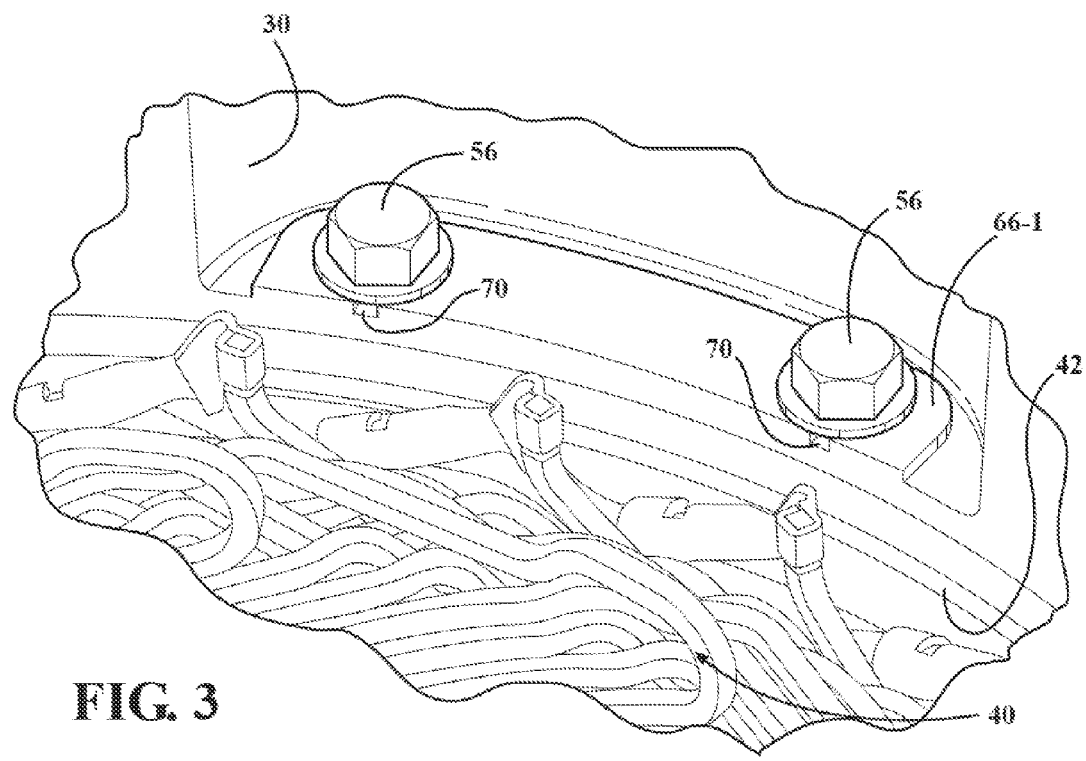
FIG. 3 is a partial close-up perspective view of the EVT depicted in FIG. 2 and showing one embodiment of a feature disposed under the fastener.
Figure 4:
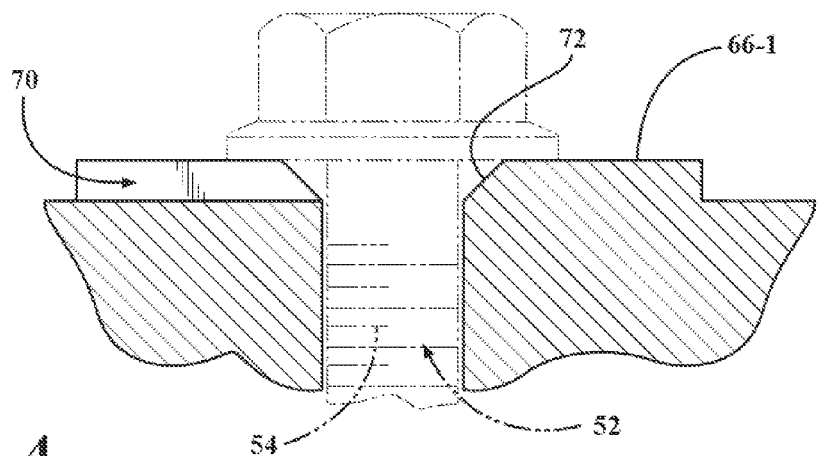
FIG. 4 is a partial close-up cross-sectional view of the EVT depicted in FIG. 3.

The EVT 22 may additionally include a feature disposed between the fastener head 56 and the drive-unit housing 30 and configured to direct the pressurized fluid 34 from under the fastener head 56 onto the wire windings 40. As shown in FIG. 3, the feature may be a step 66-1 configured as an integral part of the drive-unit housing 30. The step 66-1 may be shaped as a ledge or a depression in the drive-unit housing 30. The step 66-1 defines an aperture 68 configured to accept the fastener shank 60 en route to the passage 52. The step 66-1 additionally defines a slot 70 that originates at the aperture 68 and extends beyond the perimeter 58 of the fastener head 56. The slot 70 is in fluid communication with the passage 52 and positioned to direct the pressurized fluid 34 from under the fastener head 56 onto the wire windings 40. Accordingly, besides fixing the motor housing 42 to the drive-unit housing 30, the fastener 54 also defines an effective size of the slot 70 by restricting the height of the slot. As shown in FIG. 4, the step 66-1 may include a counter-sink 72 and/or a counter-bore located at the passage 52 adjacent the fastener head 56, while the slot 70 originates at the counter-sink or at the counter-bore.

Figure 5:
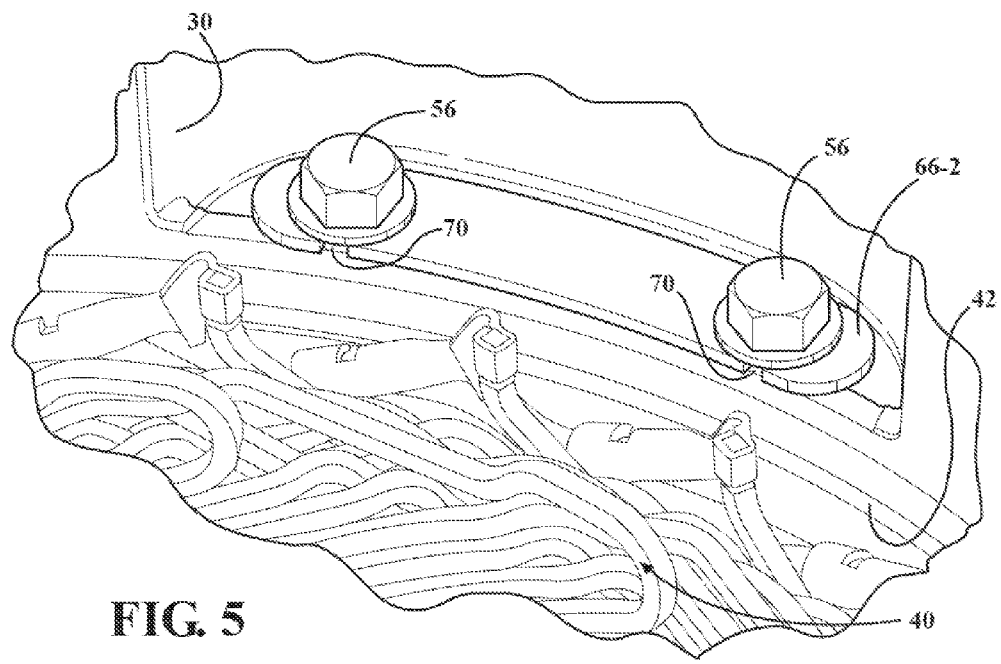
FIG. 5 is a partial close-up perspective view of the EVT depicted in FIG. 2 and showing another embodiment of a feature disposed under the fastener.
Figure 6:
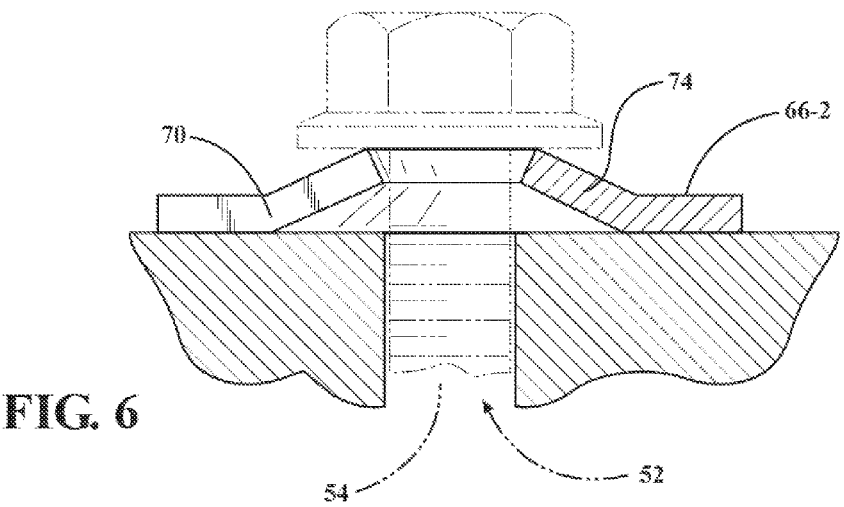
FIG. 6 is a partial close-up cross-sectional view of the EVT depicted in FIG. 5.

As shown in FIG. 5, the feature may also be a plate 66-2. The plate 66-2 is a separate and distinct component from the drive-unit housing 30 as opposed to the step 66-1 described above with respect to FIG. 3. The plate 66-2 may be constructed from any rigid material, such as aluminum, that may withstand the load from the fastener 54. Additionally, the plate 66-2 may be constructed from spring steel and include a raised edge 74. As shown, the raised edge 74 is then sandwiched between the fastener head 56 and the drive-unit housing 30 in order to preload the fastener 54 in the passage 52. Accordingly, the raised edge 74 of the plate 66-2 is configured to perform the function of a lock washer in order to assure reliable retention of the fastener 54 inside the drive-unit housing 30.

As may be seen in FIGS. 2 and 3, in the EVT 22, the drive-unit housing 30 stops short of enclosing the wire windings 40 of the specific electric motor/generator 18 or 20. Accordingly, the apertures 64 may not be placed within the drive-unit housing 30 above and in sufficient proximity to the outer perimeter of the wire windings 40 so that gravity could be used to deposit the pressurized fluid 34 from the apertures onto the wire windings. As such, the feature, whether configured as the step 66-1 or the plate 66-2, may be advantageously employed when the drive-unit housing 30 stops short of enclosing the wire windings 40 for effective cooling and/or lubrication thereof via the pressurized fluid 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electro-mechanical drive-unit connectable with at least one power source for launching and propelling a vehicle, comprising:
   an input member and an output member;
   a drive-unit housing;
   a gearing arrangement operatively connected to each of the output and input members;
   a pump configured to circulate pressurized fluid inside the drive-unit; and
   an electric motor including:
      a rotor operatively connected to the gearing arrangement;
      a stator fixed with respect to the drive-unit housing and having wire windings;
      a motor housing configured to retain the rotor and the stator; and
      a fluid cavity generated between the drive-unit housing and the motor housing and configured to receive the pressurized fluid;
   wherein:
      the drive-unit housing defines a passage that is in fluid communication with the fluid cavity; and
      a fastener having a fastener head and a fastener shank is secured within the passage such that the passage discharges the pressurized fluid from under the fastener head onto the wire windings for cooling and/or lubrication thereof.

2. The electro-mechanical drive-unit according to claim 1, further comprising a feature disposed between the fastener head and the drive-unit housing that defines an aperture configured to accept the fastener shank en route to the passage, wherein:
   the feature defines a slot originating at the aperture and extending beyond a perimeter of the fastener head; and
   the slot is in fluid communication with the passage and positioned to direct the pressurized fluid from under the fastener head onto the wire windings.

3. The electro-mechanical drive-unit according to claim 2, wherein the feature is a step configured as an integral part of the drive-unit housing.

4. The electro-mechanical drive-unit according to claim 2, wherein the feature includes at least one of a counter-sink and a counter-bore located at the passage adjacent the fastener head and the slot originates at the at least one of the counter-sink and the counter-bore.

5. The electro-mechanical drive-unit according to claim 2, wherein the fastener fixes the motor housing to the drive-unit housing and defines an effective size of the slot.

6. The electro-mechanical drive-unit according to claim 2, wherein the feature is a plate that is a separate and distinct component from the drive-unit housing.

7. The electro-mechanical drive-unit according to claim 5, wherein the plate includes a raised edge sandwiched between the fastener head and the drive-unit housing and configured to preload the fastener in the passage.

8. The electro-mechanical drive-unit according to claim 1, further comprising a plurality of seals, wherein the plurality of seals is disposed between the drive-unit housing and the motor housing to seal the fluid cavity.

9. The electro-mechanical drive-unit according to claim 1, wherein the motor housing defines apertures configured to discharge the pressurized fluid onto the wire windings for cooling of the wire windings.

10. The electro-mechanical drive-unit according to claim 1, further comprising a pressure relief valve in fluid communication with the pump and configured to control pressure of the fluid in the cavity.

11. A hybrid vehicle comprising:
    an engine;
    a drive wheel; and
    an electro-mechanical drive-unit operatively connected with the engine for launching and propelling the vehicle, the drive-unit including:
       an input member operatively connected to the engine;
       an output member operatively connected to the drive wheel;
       a drive-unit housing;
       a gearing arrangement operatively connected to each of the output and input members;
       a pump configured to circulate pressurized fluid inside the drive-unit; and
       an electric motor including:
          a rotor operatively connected to the gearing arrangement;
          a stator fixed with respect to the drive-unit housing and having wire windings;
          a motor housing configured to retain the rotor and the stator; and
          a fluid cavity generated between the drive-unit housing and the motor housing and configured to receive the pressurized fluid from the pump;
    wherein:
       the drive-unit housing defines a passage that is in fluid communication with the fluid cavity; and
       a fastener having a fastener head and a fastener shank is secured within the passage such that the passage discharges the pressurized fluid from under the fastener head onto the wire windings for cooling and/or lubrication thereof 12. The hybrid vehicle according to claim 11, further comprising a feature disposed between the fastener head and the drive-unit housing and defining an aperture configured to accept the fastener shank en route to the passage;
   wherein:
      the feature defines a slot originating at the aperture and extending beyond a perimeter of the fastener head; and wherein the slot is in fluid communication with the passage and positioned to direct the pressurized fluid from under the fastener head onto the wire windings.

13. The hybrid vehicle according to claim 12, wherein the feature is a step configured as an integral part of the drive-unit housing.

14. The hybrid vehicle according to claim 12, wherein the feature includes at least one of a counter-sink and a counter-bore located at the passage adjacent the fastener head and the slot originates at the at least one of the counter-sink and the counter-bore.

15. The hybrid vehicle according to claim 12, wherein the fastener fixes the motor housing to the drive-unit housing and defines an effective size of the slot.

16. The hybrid vehicle according to claim 12, wherein the feature is a plate that is a separate and distinct component from the drive-unit housing.

17. The hybrid vehicle according to claim 15, wherein the plate includes a raised edge sandwiched between the fastener head and the drive-unit housing and configured to preload the fastener in the passage.

18. The hybrid vehicle according to claim 11, further comprising a plurality of seals, wherein the plurality of seals is disposed between the drive-unit housing and the motor housing to seal the fluid cavity.

19. The hybrid vehicle according to claim 11, wherein the motor housing defines apertures configured to discharge the pressurized fluid onto the wire windings for cooling and/or lubrication of the wire windings.

20. The hybrid vehicle according to claim 11, further comprising a pressure relief valve in fluid communication with the pump and configured to control pressure of the fluid in the cavity.

* * * * *